(12) United States Patent
Jones et al.

(10) Patent No.: US 6,619,272 B2
(45) Date of Patent: Sep. 16, 2003

(54) IN-TANK FUEL SUPPLY UNIT

(75) Inventors: Bill George Jones, Hockley (GB); Colin Edward Mack, Maldon (GB); Derek Hirst, North Weald Bassett (GB); John Clinton Hall, Danbury (GB); James Norton, London (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/139,561

(22) Filed: May 6, 2002

(65) Prior Publication Data

US 2003/0000502 A1 Jan. 2, 2003

(30) Foreign Application Priority Data

May 5, 2001 (GB) .............................................. 0111082

(51) Int. Cl.[7] .............................................. F02M 37/04
(52) U.S. Cl. ........................ 123/514; 123/509; 417/198
(58) Field of Search ................................ 417/198, 194, 417/151, 80, 87; 123/514, 509; 137/842

(56) References Cited

U.S. PATENT DOCUMENTS

| | | | | | |
|---|---|---|---|---|---|
| 4,041,984 | A | * | 8/1977 | Morel | 137/842 |
| 4,911,134 | A | * | 3/1990 | Olsson | 123/514 |
| 5,024,583 | A | | 6/1991 | Sasaki et al. | |
| 5,289,810 | A | * | 3/1994 | Bauer et al. | 123/510 |
| 5,341,842 | A | | 8/1994 | Chih et al. | |
| 5,396,872 | A | | 3/1995 | Ruger et al. | |
| 5,667,366 | A | * | 9/1997 | Reef et al. | 417/198 |
| 5,692,479 | A | * | 12/1997 | Ford et al. | 123/514 |
| 6,123,511 | A | | 9/2000 | Sertier | |
| 6,210,123 | B1 | * | 4/2001 | Wittrisch | 417/194 |
| 6,269,800 | B1 | * | 8/2001 | Fischerkeller et al. | 123/514 |

* cited by examiner

Primary Examiner—Carl S. Miller
(74) Attorney, Agent, or Firm—Brinks Hofer Gilson & Lione

(57) ABSTRACT

An in-tank fuel supply unit has a reservoir mounted on the floor of a fuel tank, and a fuel pump mounted in the reservoir. The fuel level in the reservoir is maintained by means of a jet pump which is supplied with fuel through a passage. The jet pump has a nozzle which directs a flow of fuel upwards into a venturi passage which has a converging section, a parallel section and a diverging section.

12 Claims, 5 Drawing Sheets

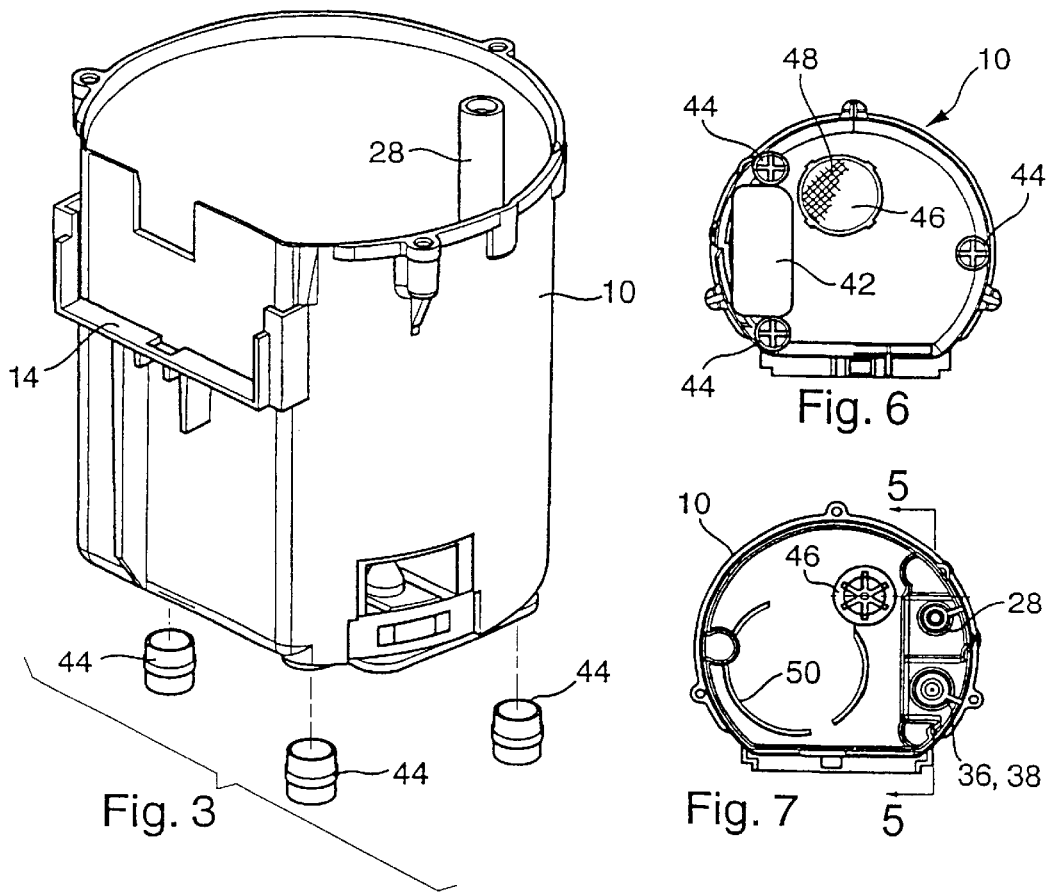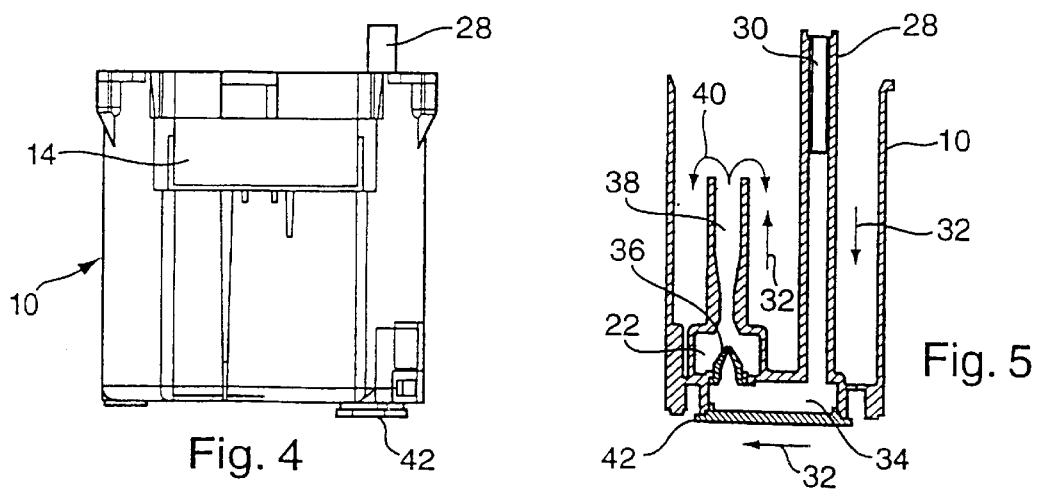

IN-TANK FUEL SUPPLY UNIT

BACKGROUND OF THE INVENTION

This invention relates to an in-tank fuel supply unit for supplying fuel from a motor vehicle fuel tank to the vehicle engine.

In-tank fuel pumps have been well known for some time. In order to ensure that there is always sufficient fuel available at the pump inlet, it is known to locate the pump in a reservoir within the tank, and to make use of a so-called jet pump to maintain a certain fuel level within the reservoir, whatever the level of fuel in the tank.

A jet pump makes use of the venturi effect by directing a high speed jet of liquid through an orifice so that the jet entrains liquid from around the orifice and pumps that liquid through the orifice.

An example of a fuel supply unit with a jet pump is shown in U.S. Pat. No. 5,341,842.

It is self-evident that the jet pump must refill the reservoir at least as fast as fastest rate at which fuel is withdrawn from the reservoir by the pump. It is therefore necessary to make the jet pump as efficient as possible.

It is also desirable to make such fuel supply units as compact as possible, and for them to be economic to manufacture in large quantities.

SUMMARY OF THE INVENTION

According to the invention, an in-tank fuel supply unit for supplying fuel from a fuel tank to a motor vehicle engine, includes a reservoir to be mounted within a fuel tank, a fuel pump mounted in the reservoir and adapted to draw fuel from the reservoir, a fuel outlet from the pump and two fuel passages connected to the outlet, one of the passages feeding fuel to the engine, and the other passage feeding fuel to a jet pump, wherein the jet pump comprises a nozzle arranged to inject fuel into a venturi, the nozzle and the venturi being arranged on a vertical axis with the nozzle injecting fuel upwards into the venturi.

Directing the venturi upwards saves space in the reservoir in a horizontal plane, but more importantly the fact that the flow from the nozzle into the reservoir is all in a straight line helps to enhance the performance of the venturi.

The venturi passage is preferably formed integrally with the reservoir, as a molded part, and has a converging section followed by a parallel-sided section followed by a diverging section. This form of the venturi passage has a big influence on venturi performance.

The venturi nozzle is preferably manufactured separately from the reservoir and is molded from a plastics material different from that of the reservoir and venturi passage. By molding the nozzle separately from the passage and the reservoir it becomes possible to optimize the materials for each part. In addition, the combination of a vertical venturi path and a separately molded nozzle allows for access to both ends of the venturi passage during molding so that the converging and diverging sections can be correctly and accurately molded.

The nozzle diameter is preferably in the range of about 0.35–0.5 mm and most preferably 0.45 mm. The nozzle length is preferably between about 1 and 2 mm, and most preferably 1.5 mm.

The distance from the tip of the nozzle to the mouth of the venturi passage is preferably between about 4 and 6 mm.

The included angle of the converging section is preferably between about 50 and 70°; the length of the parallel section of the venturi passage is preferably between about 7 and 10 mm and the diameter is preferably between about 4 and 6 mm; and the included angle of the diverging section is preferably between about 8 and 12°.

The dimensional ranges proposed have been chosen to optimize venturi performance.

BRIEF DESCRIPTION OF THE DRAWINGS

FIG. 3 is a view similar to FIG. 2 but showing different components thereof;

FIG. 4 is a side view of the unit;

FIG. 5 is a section through the unit, on the line 5—5 from FIG. 7;

FIG. 6 is an underneath view of the assembled unit;

FIG. 7 is a top view of the unit with certain components removed;

DETAILED DESCRIPTION OF THE INVENTION

Figure 1:
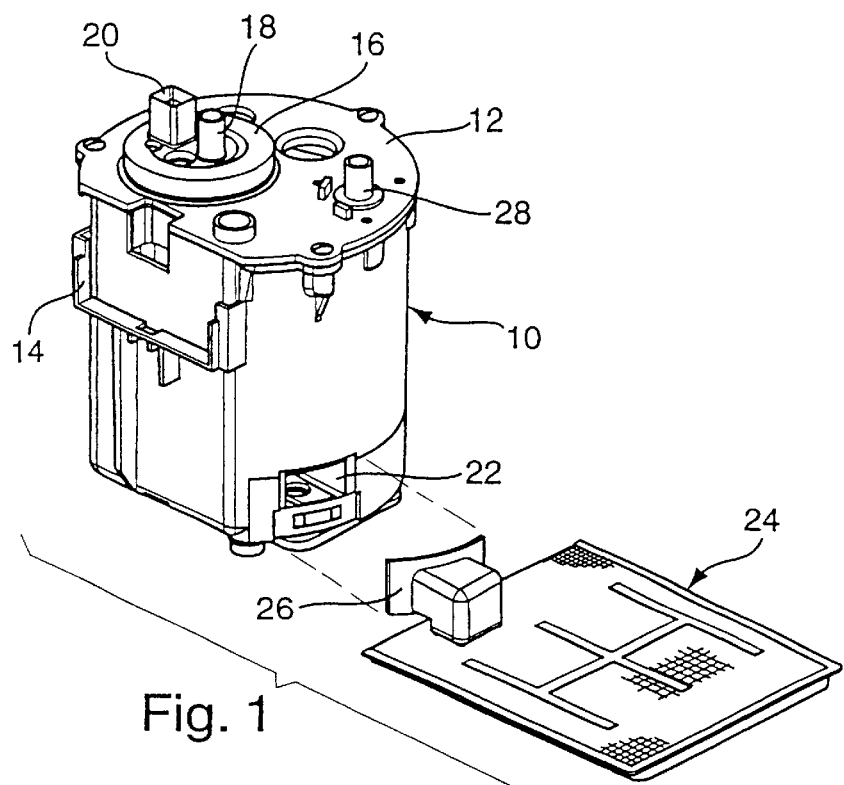
FIG. 1 is a perspective view of a fuel supply unit in accordance with the invention, with an external filter component shown detached.

FIG. 1 shows part of a fuel supply unit for mounting within a motor vehicle fuel tank. The unit comprises a reservoir 10 in the form of a substantially closed container with a lid 12. A mounting location 14 for a fuel level sensor is provided on one face of the unit. Within the unit is a fuel pump 16. Only the top of this pump can be seen in FIG. 1, but the body of the pump is located within the reservoir 10 and the pump is designed to pump fuel out of the reservoir through an outlet 18. Also visible on top of the pump 16 is a socket 20 by which electrical connections to the pump can be made.

Near its bottom surface, the reservoir has an intake recess 22 in which a jet pump is mounted. In use, a filter sock 24 is plugged into the recess 22 through a connector 26. The filter sock 24 consists, in this embodiment, of a double-sided rectangular mesh pocket within which a 'double H' plastic spacer 28 is inserted.

When the pump 16 is running, there is a constant feed of pumped fuel to the jet pump in the recess 22. The jet pump causes fuel to be drawn from the tank, through the filter sock 24 and the connector 26, into the reservoir 10 to maintain the level of fuel inside the reservoir to ensure that there is always fuel for the pump 16 to pump.

The construction of the jet pump will be described in more detail with reference to the following figures. There are three main components, namely a supply passage, a nozzle and a venturi.

The supply passage 28 is connected by means of a flexible pipe (not shown) to the output 18 of the pump 16. Between the output 18 and the supply passage 28 there is a flow splitter, so that part of the output flow from the pump output 18 goes directly to the vehicle engine, and part is used to supply the jet pump supply passage 28.

A filter 30 (FIG. 2) is inserted into the top of the supply passage 28, to prevent impurities passing into the supply passage and possibly leading to blocking of the jet pump nozzle. This filter is of the type often referred to as a pencil filter.

Referring now to FIG. 5, the direction of fuel flow through the jet pump is indicated by arrows 32. The fuel flows down the supply passage 28 into a chamber 34. The fuel from the chamber 34 passes upwards through a nozzle 36 into a venturi tube 38. As the fuel passes in a narrow, fast jet upwards from the nozzle 36 into the venturi 38, it entrains and carries with it fuel from the recess 22 which overflows from the top of the tube 38 as indicated by arrows 40 to fill the reservoir 10.

Figure 2:
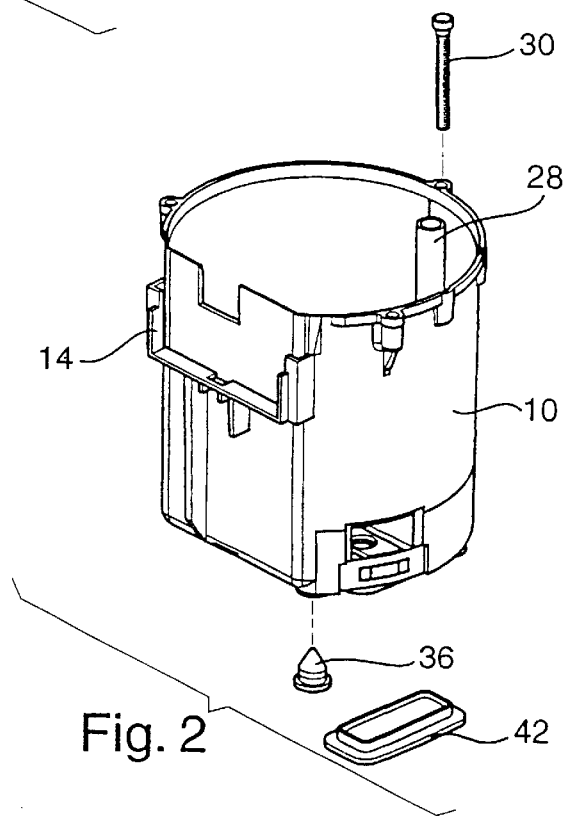
FIG. 2 shows the unit of FIG. 1 in an exploded condition.

FIG. 2 shows the nozzle 36 and a closure plate 42 separated from the reservoir 10. FIG. 3 shows these components assembled to the reservoir, but shows, separated, three rubber isolator feet 44 which will be mounted on the base of the reservoir 10. The height of the feet 44 is such that the closure plate 42 is supported off the floor of the fuel tank in which the reservoir is mounted.

FIG. 6 shows the underside of the reservoir. The three feet 44 (or sockets for receiving the feet) are clearly visible, as is the closure plate 42. A one-way valve 46 protected by a mesh screen 48 is placed in the bottom of the container. This valve, which may be of the 'umbrella' type, allows fuel to enter the tank when the level of fuel outside the tank is greater than that inside the tank (e.g. when the tank is being refilled with the engine switched off and the jet pump not running) but shuts to prevent reverse fuel flow when the level of fuel in the reservoir 10 is higher than that in the surrounding tank.

As can be seen in FIG. 7, a circular rib 50 is molded onto the floor of the reservoir 4, to locate the fuel pump. The jet pump components 28, 36, 38 are all positioned close to one wall of the reservoir 10 so that they take up a minimum amount of space within the reservoir but are nevertheless contained within the generally cylindrical form of the reservoir.

The detailed construction of the jet pump is important to ensuring satisfactory performance.

Figure 8:
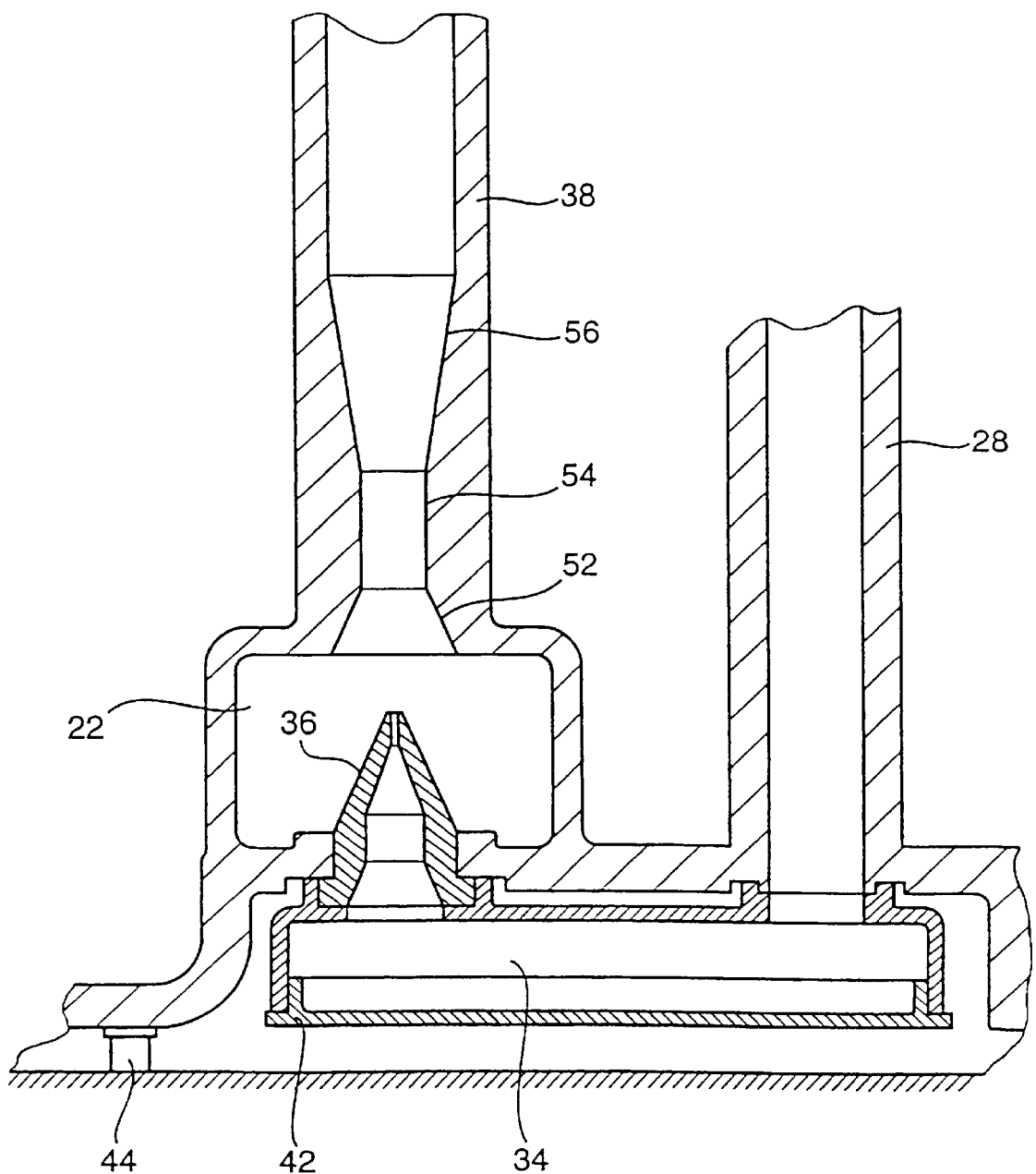
FIGS. 8 and 9 show two sections, mutually at right angles, through the jet pump.
Figure 9:
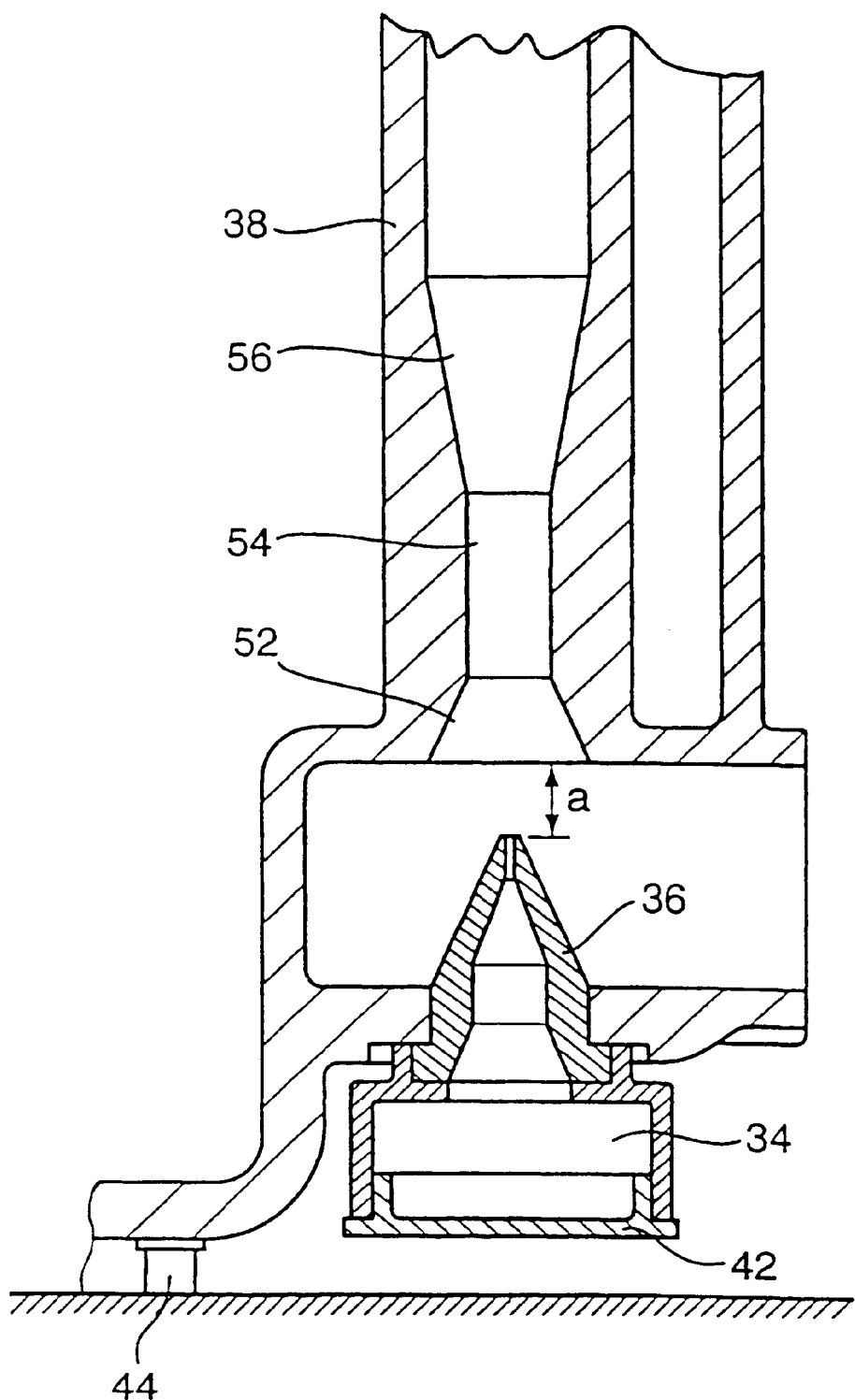

In order to avoid the entrained fuel flow from having to turn corners, the nozzle 36 is arranged so that fuel passing through the nozzle travels in a vertical, upwards direction. Certain parameters of the dimensions of the nozzle (see FIGS. 8 and 9) are also important.

First of all, the venturi passage 38 has a first, converging portion 52, a second parallel-sided portion 54 and a third, diverging portion 56.

The nozzle 36 is made as a separate component. This has two advantages. Firstly, it makes is possible for the venturi passage 38 to be injection molded using mold pins which enter from the top of the venturi passage 38 and through the socket for the nozzle 36, before the nozzle is mounted on its seat.

Secondly, the nozzle 46 can, with advantage, be made of a material different to that of the remaining structure of the reservoir. Typically the reservoir (including the venturi passage which will be formed as part of the main reservoir molding) will be molded from an acetyl plastics material, whilst the nozzle can be molded from a glass-filled polyphenyl sulphide material which will give superior wear resistance, particularly in the area of the nozzle passage where the high flow rate through a narrow nozzle can lead to undesirable wear.

Preferred ranges for the various dimensions are:

| | |
|---|---|
| nozzle diameter | 0.35–0.5, most preferably 0.45 mm |
| nozzle length | 1–2, most preferably 1.5 mm |
| distance a from nozzle tip to venturi mouth | 4–6 mm |
| included angle of converging section 52 | 50–70 |
| length of parallel section 54 | 7–10 mm |
| diameter of parallel section 54 | 4–6 mm |
| included angle of diverging section 56 | 12 |

Figure 10:
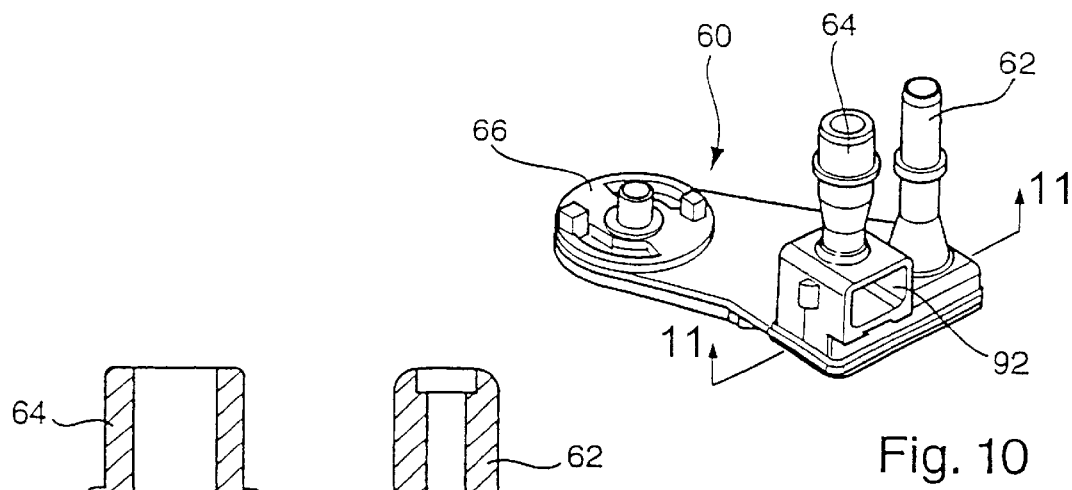
FIG. 10 is a perspective view of a fuel supply unit for positioning in a remote fuel tank region.

FIG. 10 shows a venturi unit 60 for location in a remote tank region. The unit has a supply pipe 62 and a venturi passage 64. The unit also has a mounting plate 66 by means of which the unit can be secured in place on the floor of the remote tank region.

Figure 11:
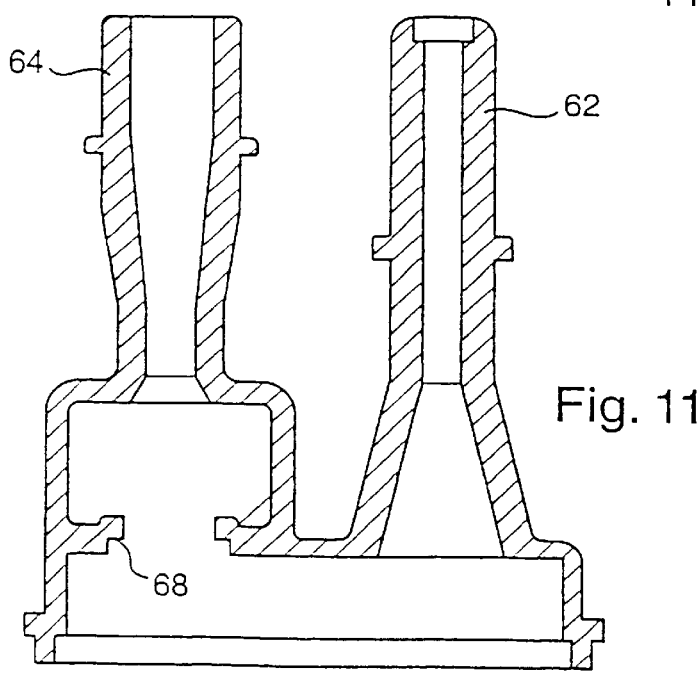
FIG. 11 is a cross-section on the line 11—11 through part of the unit of FIG. 10.

The internal form of the venturi passage 64 is substantially the same as that of the passage 38, as can be seen from FIG. 11. However FIG. 11 shows the molding with the nozzle not yet in place (the closure plate 42 is also omitted). The molding has a seat 68 for receiving the nozzle, but this seat has a large enough aperture to allow access for mould pins required to mold the converging section of the venturi passage 64.

Figure 12:
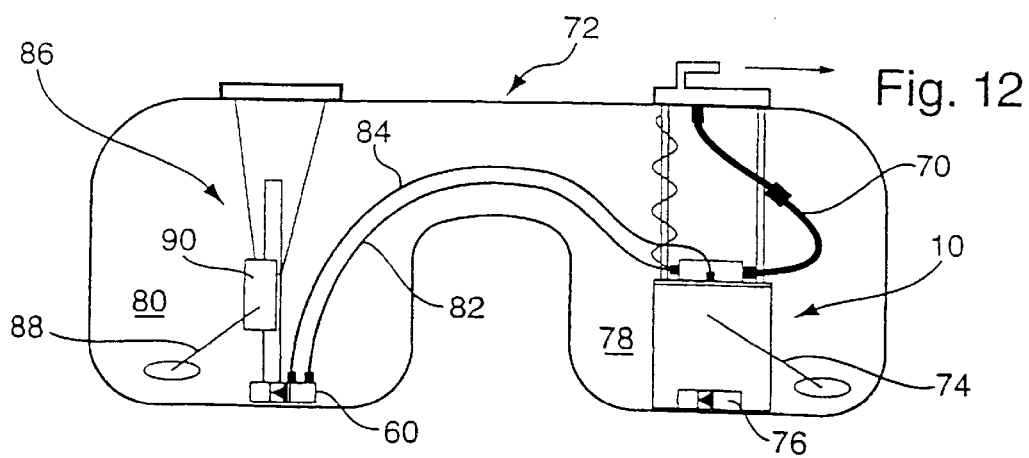
FIG. 12 schematically illustrates the relationship between the unit of FIGS. 10 and 11 and the unit of FIGS. 1 to 9.

FIG. 12 shows a saddle tank 72 which has a fuel supply unit 10 in the right hand part 78 of the tank, with a fuel pump outlet 70 leading to the vehicle engine. The Figure shows schematically a float arm 74 and a jet pump 76. In the left hand part 80 of the tank is located the unit 60. The supply pipe 62 is connected by a flexible hose 82 to an outlet of the pump in unit 10. Fuel pumped through this hose enters the venturi 64, entrains fuel from the left hand tank part 80 and pumps this fuel through a hose 84 back into the reservoir 10, so that that fuel can be pumped by the pump in the reservoir 10. The unit 60 is supported in the tank part 80 by a mounting arm 86 depending from the top of the tank. A float arm 88 is mounted on a sensor unit 90 on the same arm 86. Suitable electronics produces a signal from the sensors in both tank parts to represent the total quantity of fuel available in the tank. The unit 60 thus pumps fuel from the left hand part of the tank to the reservoir in the right hand part, when the main pump in the reservoir is operating.

A filter 24, 26 will be associated with the unit 60, and will be attached to the edges of a recess 92.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. An in-tank fuel supply unit for supplying fuel from a fuel tank to a motor vehicle engine, the unit comprising a reservoir to be mounted within a fuel tank, a fuel pump mounted in the reservoir and adapted to draw fuel from the reservoir, a fuel outlet from the pump and two fuel passages connected to the outlet, one of the passages feeding fuel to the engine, and the other of the passages feeding fuel to a jet pump, wherein the jet pump comprises a nozzle arranged to inject fuel into a venturi passage, the nozzle and the venturi passage being arranged on a vertical axis with the nozzle injecting fuel upwards into the venturi passage, the venture passage having a converging section followed by a parallel-sided section followed by a diverging section, wherein the venture passage is formed integrally with the reservoir from a molded material, and the nozzle is molded from a plastics material different from the material of the reservoir and venturi passage, the plastics material of the nozzle having a relatively higher wear resistance than the material of the reservoir and venturi passage.

2. An in-tank fuel supply unit for supplying fuel from a fuel tank to a motor vehicle engine, the unit comprising a reservoir to be mounted within a fuel tank, a fuel pump mounted in the reservoir and adapted to draw fuel from the reservoir, a fuel outlet from the pump and two fuel passages connected to the outlet, one of the passages feeding fuel to the engine, and the other of the passages feeding fuel to a jet pump, wherein the jet pump comprises a nozzle arranged to inject fuel into a venturi passage, the nozzle and the venturi passage being arranged on a vertical axis with the nozzle injecting fuel upwards into the venturi passage, wherein the venturi passage has a converging section followed by a parallel-sided section followed by a diverging section, the length of the parallel-sided section of the venturi passage being between about 7 and 10 mm.

3. The fuel supply unit of claim 2, wherein the distance from the tip of the nozzle to the mouth of the venturi passage is between 4 and 6 mm.

4. The fuel supply unit of claim 2, wherein the included angle of the converging section is between 50 and 700.

5. The fuel supply unit of claim 3, wherein the nozzle has a length of between about 1 and 2 mm.

6. The fuel supply unit of claim 4, wherein the included angle of the diverging section is between 8 and 12°.

7. The fuel supply unit of claim 1, wherein the reservoir and venturi passage material is an acetyl plastics material.

8. The fuel supply unit of claim 7, wherein nozzle material is a filled polyphenyl sulphide material.

9. The fuel supply unit of claim 8, wherein the nozzle diameter is in the range of about 0.35–0.5 mm.

10. The fuel supply unit of claim 9, wherein the nozzle diameter is substantially 0.45 mm.

11. The fuel supply unit of claim 5, wherein the nozzle length is substantially 1.5 mm.

12. The fuel supply unit of claim 2, wherein the diameter of the parallel-sided section is between about 4 and 6 mm.

* * * * *

UNITED STATES PATENT AND TRADEMARK OFFICE
CERTIFICATE OF CORRECTION

PATENT NO.   : 6,619,272 B2
DATED        : September 16, 2003
INVENTOR(S)  : Bill George Jones et al.

It is certified that error appears in the above-identified patent and that said Letters Patent is hereby corrected as shown below:

<u>Column 6,</u>
Line 5, delete "700." and substitute -- 70°. -- in its place.

Signed and Sealed this

Twenty-seventh Day of January, 2004

JON W. DUDAS
*Acting Director of the United States Patent and Trademark Office*